(12) United States Patent
Lo et al.

(10) Patent No.: US 11,468,864 B2
(45) Date of Patent: Oct. 11, 2022

(54) METHOD FOR DATA TRANSMISSION BETWEEN TRANSMITTING END AND RECEIVING END, AND DEVICE, SYSTEM, DISPLAY DEVICE ASSOCIATED THEREWITH

(71) Applicants: BEIJING BOE DISPLAY TECHNOLOGY CO., LTD., Beijing (CN); BOE TECHNOLOGY GROUP CO., LTD., Beijing (CN)

(72) Inventors: Hsinchung Lo, Beijing (CN); Xin Duan, Beijing (CN); Wei Sun, Beijing (CN); Ming Chen, Beijing (CN)

(73) Assignees: BEIJING BOE DISPLAY TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 686 days.

(21) Appl. No.: 16/340,893

(22) PCT Filed: Nov. 5, 2018

(86) PCT No.: PCT/CN2018/113913
§ 371 (c)(1),
(2) Date: Apr. 10, 2019

(87) PCT Pub. No.: WO2019/165799
PCT Pub. Date: Sep. 6, 2019

(65) Prior Publication Data
US 2021/0358450 A1 Nov. 18, 2021

(30) Foreign Application Priority Data
Mar. 1, 2018 (CN) .......................... 201810172398.5

(51) Int. Cl.
*G09G 5/00* (2006.01)
*G09G 3/36* (2006.01)
(Continued)

(52) U.S. Cl.
CPC ........... *G09G 5/008* (2013.01); *G09G 3/3611* (2013.01); *G09G 5/363* (2013.01); *G09G 5/393* (2013.01)

(58) Field of Classification Search
CPC ...... G09G 5/008; G09G 3/3611; G09G 5/363; G09G 5/393
(Continued)

(56) References Cited

U.S. PATENT DOCUMENTS 5,099,497 A  3/1992 Ohno et al.
5,257,287 A  10/1993 Blumenthal et al.
(Continued)

FOREIGN PATENT DOCUMENTS

CN  1599426 A  3/2005
CN  1905435 A  1/2007
(Continued)

OTHER PUBLICATIONS

"Communication with Supplementary European Search Report", EP Application No. 18863805.0, dated Nov. 19, 2021, 10 pp.
(Continued)

*Primary Examiner* — Jonathan M Blancha
(74) *Attorney, Agent, or Firm* — Myers Bigel, P.A.

(57) ABSTRACT

The present disclosure relates to a data transmission method, device, system, and display device. The method includes encoding clock training data to obtain two sets of encoded data corresponding to the clock training data and complementary to each other, sending a specified set of encoded data in the two sets of encoded data to a receiving end when positive and negative pins of the transmitting end and the (Continued)

receiving end are correspondingly connected, sending other set of coded data in the two sets of coded data than the specified set of encoded data to the receiving end when the positive and negative pins of the transmitting end and the receiving end are reversely connected. The receiving end may be configured to perform clock training according to the received encoded data.

16 Claims, 7 Drawing Sheets

(51) Int. Cl.
*G09G 5/36* (2006.01)
*G09G 5/393* (2006.01)

(58) Field of Classification Search
USPC .......................................................... 345/213
See application file for complete search history.

(56) References Cited

U.S. PATENT DOCUMENTS

| | | | |
|---|---|---|---|
| 2003/0046618 A1* | 3/2003 | Collins | ................... H04L 25/14 |
| | | | 714/700 |
| 2004/0189806 A1* | 9/2004 | Berkey | .............. H04N 5/23203 |
| | | | 348/192 |
| 2005/0012646 A1* | 1/2005 | Kang | ...................... H03M 5/02 |
| | | | 341/58 |
| 2005/0154946 A1* | 7/2005 | Mitbander | ............ G06F 11/221 |
| | | | 714/724 |
| 2007/0025483 A1 | 2/2007 | Emami-Neyestanak et al. | |
| 2009/0251454 A1 | 10/2009 | Jang | |
| 2014/0118235 A1 | 5/2014 | Hong et al. | |
| 2014/0301322 A1 | 10/2014 | Yang et al. | |
| 2015/0187315 A1 | 7/2015 | Park | |
| 2017/0132966 A1* | 5/2017 | Lim | ......................... G09G 5/18 |

FOREIGN PATENT DOCUMENTS

| | | |
|---|---|---|
| CN | 103166740 A | 6/2013 |
| CN | 103424660 A | 12/2013 |
| CN | 104468042 A | 3/2015 |
| CN | 107331368 A | 11/2017 |

OTHER PUBLICATIONS

"Second Office Action and English language translation", CN Application No. 201810172398.5, dated Dec. 13, 2021, 14 pp.
International Search Report and Written Opinion of the International Searching Authority (with English language translation), International Application No. PCT/CN2018/113913, dated Jan. 30, 2019, 11 pp.

* cited by examiner

| CT | |
|---|---|
| CT+ | 10'b0000011111 |
| CT- | 10'b1111100000 |

Fig.4

| DP/DN | CT+ | CT+ | ...... | CT+ | K2- | LSP1+ | LSP2- | LSP3+ | LSP4- | ...... |
|---|---|---|---|---|---|---|---|---|---|---|

⤵ Exchange positive and negative pins　　⤵ Data complement

| DN/DP | CT- | CT- | ...... | CT- | K2+ | LSP1- | LSP2+ | LSP3- | LSP4+ | ...... |
|---|---|---|---|---|---|---|---|---|---|---|

Fig.5

| LSP | |
|---|---|
| LSP1+ | 10'b1011000100 |
| LSP1- | 10'b0100111011 |

Fig.6

| DP/DN | K1+ | D0- | D1+ | ...... | K2- | IDLE+ | IDLE- | IDLE+ | IDLE- |
|---|---|---|---|---|---|---|---|---|---|

⤵ Exchange positive and negative pins　　⤵ Data complement

| DN/DP | K1- | D0+ | D1- | ...... | K2+ | IDLE- | IDLE+ | IDLE- | IDLE+ |
|---|---|---|---|---|---|---|---|---|---|

Fig.7

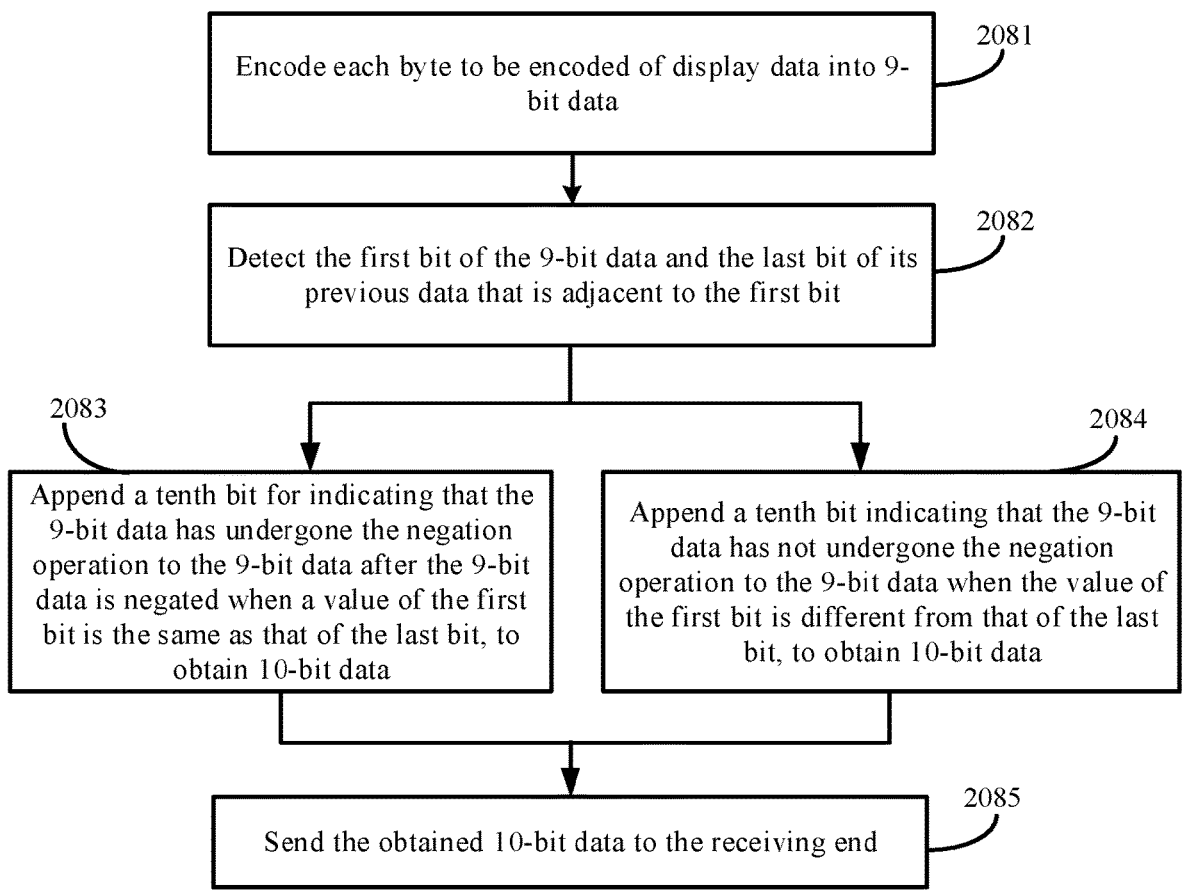

METHOD FOR DATA TRANSMISSION BETWEEN TRANSMITTING END AND RECEIVING END, AND DEVICE, SYSTEM, DISPLAY DEVICE ASSOCIATED THEREWITH

CROSS REFERENCE TO RELATED APPLICATIONS APPLICATION

The present application is a 35 U.S.C. 371 national stage application of PCT International Application No. PCT/CN2018/113913, filed on Nov. 5, 2018, which claims the benefit of Chinese Patent Application No. 201810172398.5, filed on Mar. 1, 2018, the contents of which are incorporated herein by reference in their entireties.

FIELD

The present disclosure generally relates to the technical field of signal processing, and in particular, to a data transmission method, a device, a system, and a display device.

BACKGROUND

A driving section of a liquid crystal display panel generally comprises a timing controller (TCON), a source driver (SD), and a gate driver. A main function of the timing controller is to process each frame of image data, generate a data signal corresponding to each frame of image data, and send the data signal to the source driver. The source driver may convert the data signal into a data voltage and write the data voltage to the corresponding pixel on the liquid crystal display panel.

In the related art, a differential signal line is generally utilized to transmit signals between the timing controller and the source driver. After the timing controller is powered on, encoded clock training data may be sent to the source driver through the differential signal line to align clocks of the timing controller and the source driver. As such, encoded data signal sent by the timing controller may be accurately parsed by the source driver after the encoded data signal is received at the source driver late. The differential signal line generally comprises a pair of traces, which may be used to transmit signals that are of equal values but negated. The source driver may determine a logic state of the received signal by comparing the difference of voltages on the pair of traces, and finally may decode the received signal according to the result of the determination.

However, when signals are transmitted using a differential signal line, it is necessary to ensure that the positive pins of the source driver and the timing controller are correspondingly connected, and the negative pins thereof are correspondingly connected. If the positive and negative pins of these two are connected incorrectly, the source driver will fail to receive the clock training data correctly, and then the data signal will not be correctly received and parsed.

SUMMARY

The present disclosure provides a data transmission method, device, system, and a display device.

In a first aspect, there is provided a data transmission method which is applied to a transmitting end. The method comprises: encoding clock training data to obtain two sets of encoded data corresponding to the clock training data and complementary to each other. When the positive and negative pins of the transmitting end and a receiving end are correspondingly connected, a specified set of encoded data in the two sets of encoded data is sent to the receiving end. When the positive and negative pins of the transmitting end and the receiving end are reversely connected, other set of encoded data in the two sets of encoded data than the specified set of encoded data is sent to the receiving end. The receiving end is configured to perform clock training according to the received encoded data.

Optionally, encoding clock training data to obtain two sets of encoded data corresponding to the clock training data and complementary to each other comprises: encoding the clock training data according to an encoding rule agreed with the receiving end, to obtain the specified set of encoded data; and negating the specified set of encoded data to obtain the other set of encoded data.

Optionally, after sending either set of encoded data corresponding to the clock training data to the receiving end, the method further comprises: encoding deviation correction data and then sending the encoded deviation correction data to the receiving end. The receiving end performs bit alignment according to the deviation correction data.

Optionally, either set of encoded data and the encoded deviation correction data are all 10-bit data, and the 10-bit data is binary data.

Optionally, a value of the first bit of the encoded deviation correction data is different from that of the last bit of its adjacent previous data.

Optionally, the method further comprises: encoding instruction data and then sending the encoded instruction data to the receiving end; encoding display data and then sending the encoded display data to the receiving end.

Optionally, the encoded instruction data and the encoded display data are all 10-bit data, and the 10-bit data is binary data. In the encoded instruction data and the encoded display data, the value of the first bit of each 10-bit data is different from that of the last bit of its adjacent previous data.

Optionally, the display data comprises at least one byte to be encoded. Each byte to be encoded is 8-bit data. Encoding display data and then sending the encoded display data to the receiving end comprises: encoding each 8-bit data corresponding to the byte to be encoded into 9-bit data; detecting the first bit of the 9-bit data and the last bit of previous data adjacent to the 9-bit data; when the value of the first bit is the same as that of the last bit, obtaining 10-bit data by, appending a tenth bit to the 9-bit data for indicating the 9-bit data has undergone an negation operation after the 9-bit data is negated; obtaining 10-bit data by, when the value of the first bit is different from that of the last bit, appending a tenth bit to the 9-bit data for indicating that the 9-bit data has not undergone a negation operation; and sending the obtained 10-bit data to the receiving end.

In a second aspect, there is provided a data transmission device which is applied to a transmitting end. The device comprises: an encoding module for encoding clock training data, to obtain two sets of encoded data corresponding to the clock training data and complementary to each other; a first sending module for sending a specified set of encoded data in the two sets of encoded data to the receiving end when the positive and negative pins of the transmitting end and a receiving end are correspondingly connected; and a second sending module for sending other set of encoded data in the two sets of encoded data than the specified set of encoded data to the receiving end when the positive and negative pins of the transmitting end and the receiving end are reversely connected. The receiving end is configured to perform clock training according to the received encoded data.

Optionally, the encoding module is configured to encode the clock training data according to an encoding rule agreed with the receiving end to obtain the specified set of encoded data. The specified set of encoded data is negated to obtain the other set of encoded data.

Optionally, the device further comprises a first processing module for encoding deviation correction data and then sending the encoded deviation correction data to the receiving end after a set of encoded data corresponding to the clock training data is sent to the receiving end. The receiving end performs bit alignment according to the deviation correction data.

Optionally, either set of encoded data and the encoded deviation corrected data are all 10-bit data, and the 10-bit data is binary data.

Optionally, a value of the first bit of the encoded deviation correction data is different from that of the last bit of its adjacent previous data.

Optionally, the device further comprises a second processing module, for encoding instruction data and then sending the encoded instruction data to the receiving end after the encoded deviation correction data is sent to the receiving end; and a third processing module for encoding the display data and then sending the encoded display data to the receiving end.

Optionally, the encoded instruction data and the encoded display data are all 10-bit data, and the 10-bit data is binary data. In the encoded instruction data and the encoded display data, the value of the first bit of each 10-bit data is different from that of the last bit of its adjacent previous data.

Optionally, the display data comprises at least one byte to be encoded, and each of the bytes to be encoded is 8-bit data. The third processing module is configured to encode each 8-bit data corresponding to the byte to be encoded into 9-bit data; detect a first bit of the 9-bit data and a last bit of previous data adjacent to the 9-bit data; obtain 10-bit data by, appending a tenth bit to the 9-bit data for indicating the 9-bit data has undergone an negation operation after the 9-bit data is negated; obtain 10-bit data by, when the value of the first bit is different from that of the last bit, appending a tenth bit to the 9-bit data for indicating that the 9-bit data has not undergone a negation operation. The obtained 10-bit data is sent to the receiving end.

In a third aspect, a data transmission device is provided. The device comprises a memory, a processor, and a computer program stored in the memory and executable in the processor, and the processor implements the data transmission method according to the first aspect when executing the computer program.

In a fourth aspect, a data transmission system is provided. The system comprises: a transmitting end and a receiving end, and the transmitting end comprises the data transmission device according to the second aspect or the third aspect.

In a fifth aspect, a display device is provided. The display device comprises a timing controller and a source driving chip connected to the timing controller. The timing controller is a transmitting end and the source driving chip is a receiving end. The timing controller comprises the data transmission device according to the second aspect or the third aspect.

In a sixth aspect, a computer readable storage medium is provided. The computer readable storage medium stores instructions that, when executed on a computer, cause the computer to implement the data transmission method according to the first aspect.

It should be understood that the above general description and the following detailed description are merely exemplary and are not intended to limit the disclosure.

BRIEF DESCRIPTION OF THE DRAWINGS

The above and other aspects of the present disclosure will now be described in more detail with reference to figures which illustrate embodiments of the present disclosure.

FIG. 4 is a schematic diagram of two sets of encoded data obtained by encoding clock training data according to an embodiment of the present disclosure;

FIG. 5 is a schematic diagram illustrating a further structure of data sent by a timing controller to a source driving chip according to an embodiment of the present disclosure;

FIG. 6 is a schematic diagram of encoded data obtained by encoding deviation correction data according to an embodiment of the present disclosure;

FIG. 7 is a schematic diagram illustrating a still further structure of data sent by a timing controller to a source driving chip according to an embodiment of the present disclosure;

FIG. 8 is a schematic diagram of encoded data obtained by encoding instruction data according to an embodiment of the present disclosure;

FIG. 9 is a schematic diagram of encoded data obtained by encoding display data according to an embodiment of the present disclosure;

FIG. 10 is a flowchart of a method for encoding and sending display data to a receiving end according to an embodiment of the present disclosure;

The figures here are incorporated in the specification and constitute a part of the specification, which show embodiments compliant with the present disclosure and are used to explain the principles of the present disclosure along with the specification.

DETAILED DESCRIPTION

For explanation, rather than limitation, the following depictions state some particular details of the disclosed embodiments, so that the disclosure can be clearly and thoroughly understood. Those skilled in the art, however, should readily understand that, without seriously departing from the spirit and scope of the present disclosure, the present disclosure can be implemented according to other embodiments that do not precisely conform to the details described herein. Moreover, in the context, for the sake of brevity, detailed description of some known equipment, circuits and methods are omitted so as to avoid redundant details and possible confusions.

Figure 1A:
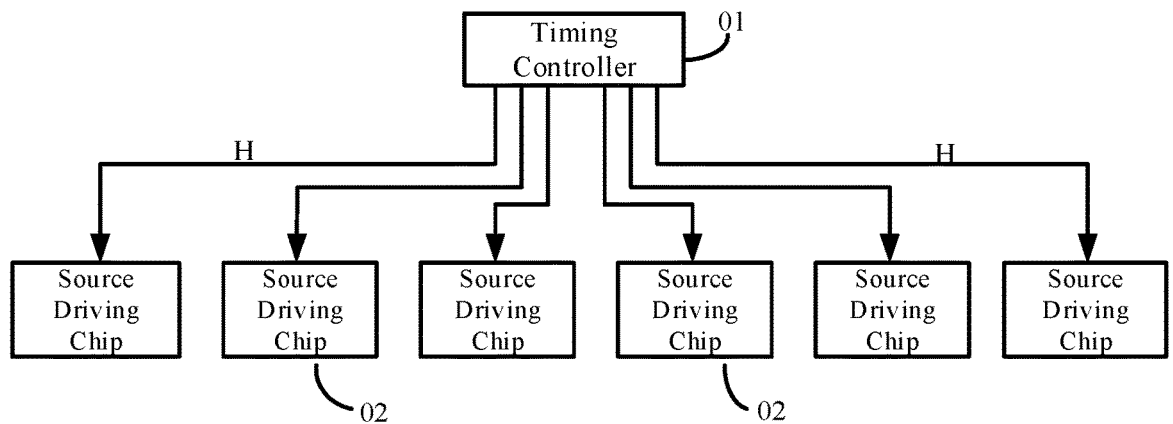
FIG. 1A is a schematic diagram of an application scenario of a data transmission method according to an embodiment of the present disclosure.

FIG. 1A is a schematic diagram of an application scenario of a data transmission method according to an embodiment of the present disclosure. As shown in FIG. 1A, the data transmission method may be applied to a display device. The display device may comprise a timing controller 01 and a source driver. The source driver may comprise a plurality of source driving chips 02. The timing controller 01 and each of the source driving chips 02 may be connected via a differential signal line H. The differential signal line H may be used to transmit high speed differential signals.

Figure 1B:
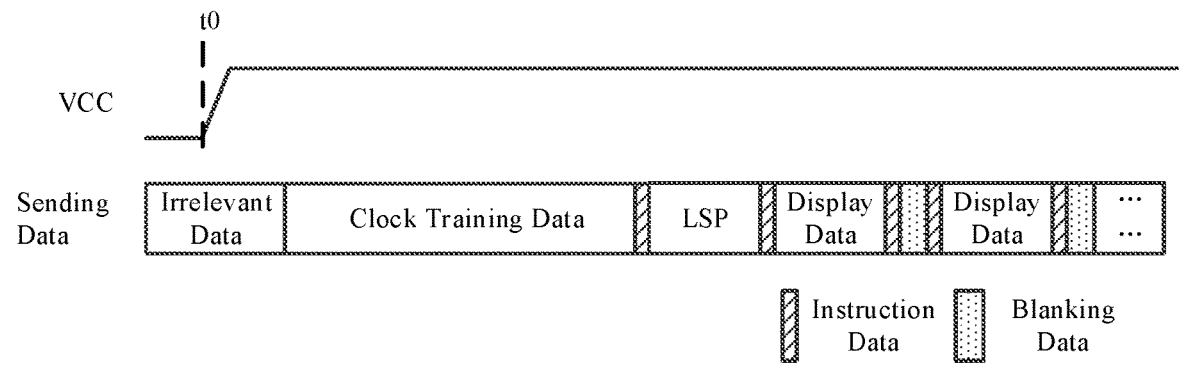
FIG. 1B is a schematic diagram illustrating a structure of data sent by a timing controller to a source driving chip according to an embodiment of the present disclosure.

In embodiments of the present disclosure, when data is transmitted between the timing controller 01 and the source driving chip 02, the data to be transmitted may be sent to the receiving end after being encoded based on a point-to-point (P2P) transmission protocol. FIG. 1B is a schematic diagram illustrating a structure of data sent by a timing controller to a source driving chip according to an embodiment of the present disclosure. Referring to FIG. 1B, after the timing controller is powered on (i.e., the power supply voltage VCC of the timing controller jumps from a low level to a high level at time t0), encoded clock training data may be first sent to the source driving chip to achieve clock synchronization between these two. Thereafter, the timing controller may send encoded deviation correction data to the source driving chip to achieve bit synchronization of these two. The deviation correction data may also be referred to as link stable pattern (LSP) data. Further, the timing controller may send encoded display data and related instruction data to the source driving chip, and the source driving chip may convert the received display data into a data voltage and write the data voltage to corresponding pixels on the liquid crystal display panel.

In addition, the data sent during the power-on of the timing controller may be any applicable data. For example, as shown in FIG. 1B, the data sent by the timing controller during the power-on phase may be irrelevant data. When the display device displays an image, the gate driving circuit scans pixels in the display panel progressively, wherein the scanning interval between two adjacent rows of pixels is called a horizontal blanking (HB) phase. The timing controller may send blanking data to the source driving chip during the horizontal blanking phase, and the blanking data may be invalid (IDLE) data, for example, the blanking data may all be zero.

Since data is transmitted between the timing controller 01 and the source driving chip 02 through a differential signal line, it should be ensured in the related art that a positive pin DP of the timing controller 01 is correspondingly connected to a positive pin of the source driving chip 02, and a negative pin DN of the timing controller 01 is correspondingly connected to a negative pin of the source driving chip 02. If the positive and negative pins of these two are reversely connected, the clock training data received by the source driving chip 02 will be negated, and clock training (CT) would not be realized, and display data would not be correctly received and parsed.

In a manufacturing process of a display device, a Pin Map of the timing controller 01 is usually fixed. As such, when a printed circuit board (PCB) is designed for connection between the timing controller 01 and the source driving chip 02, it is required to consider the relative position between the timing controller 01 and the source driving chip 02 and the orientation of the timing controller 01 to ensure that positive and negative pins of these two can be correspondingly connected. If pins of the timing controller 01 and the source driving chip 02 are in a reverse order or misaligned, the positive and negative pins of these two will not be correspondingly connected, which requires to redesign the PCB, thereby increasing the manufacturing cost of the display device.

In view of the above problem, an embodiment of the present disclosure provides a data transmission method, wherein a transmitting end may send a corresponding encoded data to a receiving end based on a connection relationship of positive and negative pins of the transmitting end and the receiving end to ensure that the receiving end may correctly receive and parse the data even if the positive and negative pins of the transmitting end and the receiving end are reversely connected.

It should be noted that, in addition to the display device shown in FIG. 1A, the data transmission method provided by the embodiment of the present disclosure may also be applied to other transmitting ends that use a differential signal line to transmit signals and require to perform clock training together with a receiving end.

Figure 2:
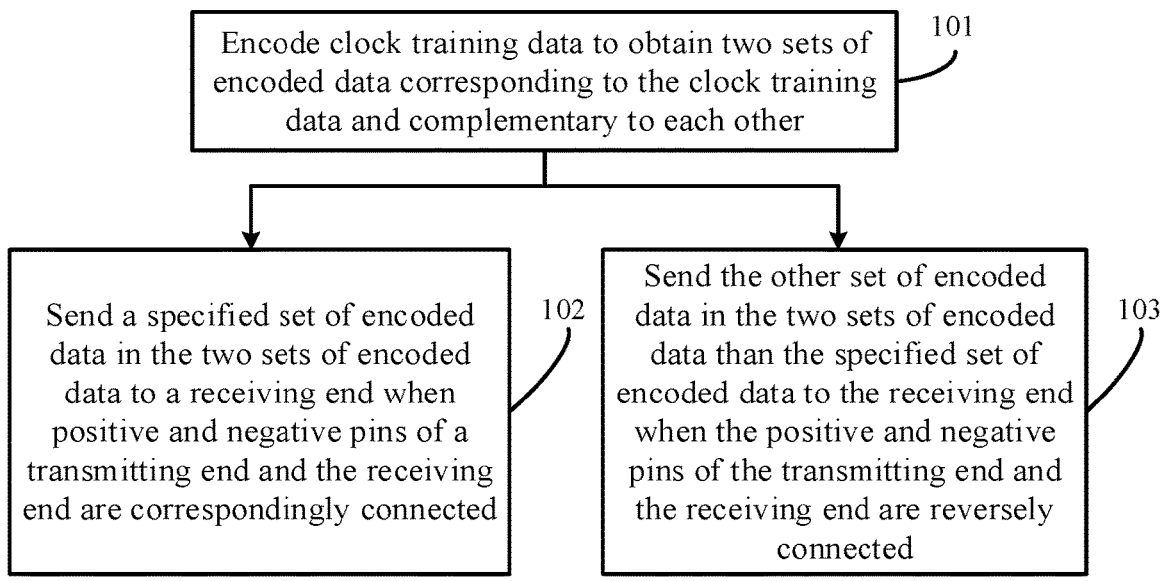
FIG. 2 is a schematic flowchart of a data transmission method according to an embodiment of the present disclosure.

FIG. 2 is a schematic flowchart of a data transmission method according to an embodiment of the present disclosure. The method may be applied to a transmitting end, for example, to the timing controller 01 shown in FIG. 1A. Referring to FIG. 2, the method may comprise:

Step 101: encoding the clock training data to obtain two sets of encoded data corresponding to the clock training data and complementary to each other.

In embodiments of the present disclosure, the two sets of encoded data that are complementary to each other have the same length (that is, they include the same number of bits), and in the two sets of encoded data, one set of encoded data is obtained by negating the other set of encoded data.

For example, supposing that each set of encoded data comprises multi-bit binary data, since binary data comprises 0 and 1, wherein 1 is negated to 0 and 0 is negated to 1, then complementation of two sets of encoded data may also mean values of corresponding bits in the two sets of encoded data are different.

Step 102: when the positive and negative pins of the transmitting end and the receiving end are correspondingly connected, sending a specified to set of encoded data in the two sets of encoded data to the receiving end.

The specified set of encoded data may be a set of encoded data that the transmitting end obtains by performing encoding according to an encoding rule agreed with the receiving end in advance. After receiving the encoded data, the receiving end may directly decode the encoded data based on a decoding rule corresponding to the agreed encoding rule to obtain the clock training data, and perform clock training according to the clock training data.

Step 103: when the positive and negative pins of the transmitting and the receiving end are reversely connected, sending the other set of encoded data in the two sets of encoded data than the specified set of encoded data to the receiving end.

Since the other set of encoded data is complementary to the specified set of encoded data, the encoded data actually received by the receiving end is the same as the specified set of encode data when the positive and negative pins of the transmitting end and the receiving end are reversely connected. As a result, the receiving end may still perform correct decoding to obtain the clock training data and perform clock training.

In summary, the embodiment of the present disclosure provides a data transmission method, which may generate two sets of encoded data that are complementary to each other when encoding clock training data. When the positive and negative pins of the transmitting end and the receiving end are correspondingly connected, the transmitting end may send a specified set of encoded data, and the receiving end may perform normal decoding based on the specified set of encoded data. When the positive and negative pins of the transmitting end and the receiving end are reversely connected, the transmitting end may send the other set of encoded data. Since the other set of encoded data is complementary to the specified set of encoded data, when the positive and negative pin are reversely connected, the encoded data actually received by the receiving end is the same as the specified set of encoded data, and thus will be correctly decoded. Therefore, the problem that the receiving end cannot perform correct decoding due to wrong connection between pins of the transmitting end and the receiving end will be avoided, and the reliability and flexibility of data transmission are effectively improved.

Figure 3:
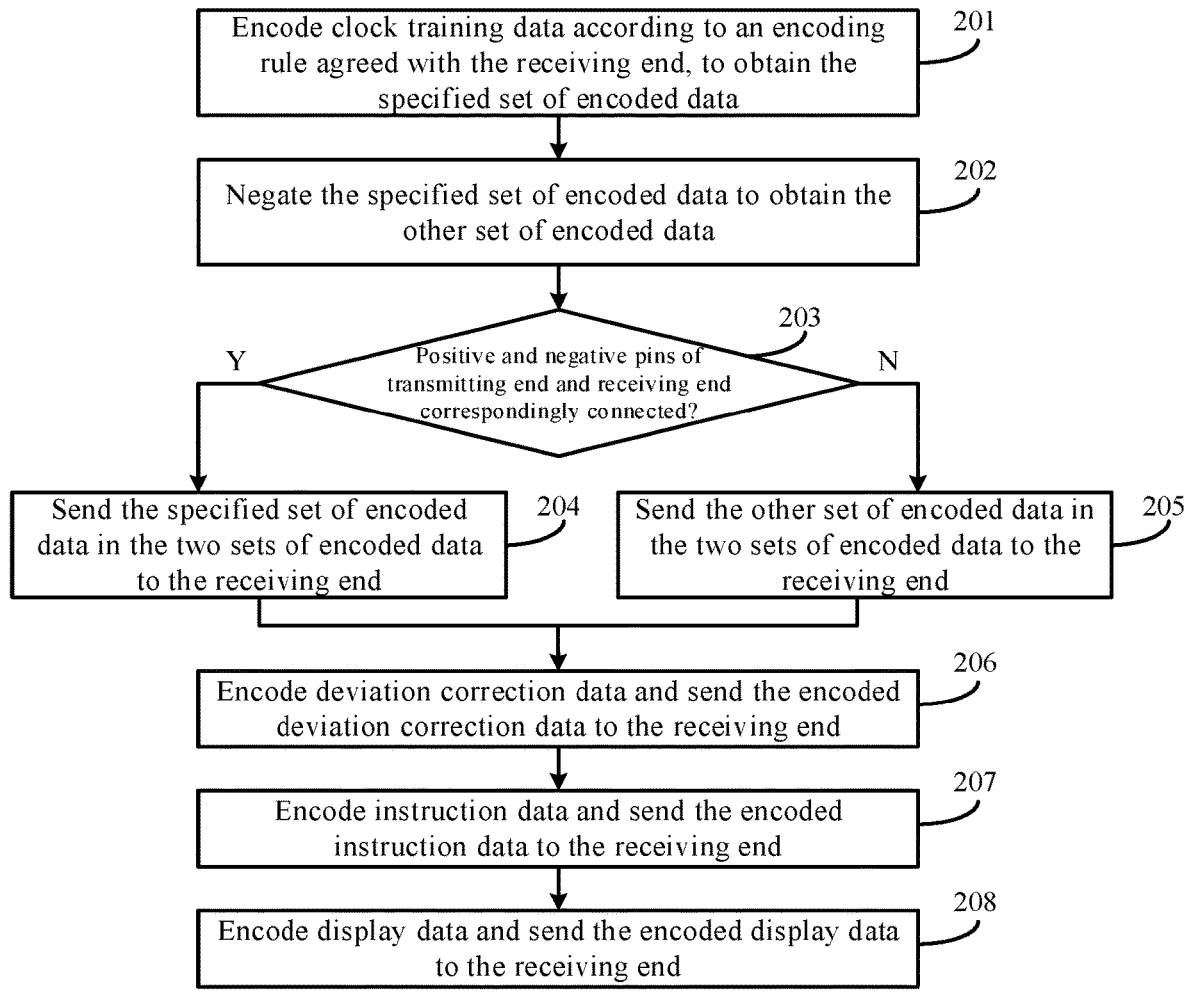
FIG. 3 is a schematic flowchart diagram of another data transmission method according to an embodiment of the present disclosure.

FIG. 3 is a schematic flowchart diagram of another data transmission method according to an embodiment of the present disclosure. The method may be applied to a transmitting end, for example, to the timing controller 01 shown in FIG. 1A. Referring to FIG. 3, the method may comprise:

Step 201: encoding clock training data according to an encoding rule agreed with the receiving end to obtain a specified set of encoded data.

In embodiments of the present disclosure, the transmitting end and the receiving end may agree on an encoding rule and a corresponding decoding rule for the clock training data in advance, and the encoding rule and the decoding rule may be set on the premise that the positive and negative pins of the transmitting end and the receiving end are correspondingly connected.

Optionally, the specified set of coded data that the transmitting end obtains by encoding the clock training data according to the agreed encoding rule may be 10-bit data, and each bit of the 10-bit data is binary data. For example, as shown in FIG. 4, the specified set of encoded data CT+ that the timing controller obtains by encoding the clock training CT data may be 0000011111, and "10'b" in FIG. 4 is used to indicate that the set of encoded data is 10-bit binary data.

Step 202: negating the specified set of encoded data to obtain the other set of encoded data.

Further, the transmitting end may negate each bit in the specified set of encoded data to obtain the other set of encoded data that is complementary to the specified set of encoded data.

Exemplarily, as shown in FIG. 4, after the timing controller negates each bit in the specified set of encoded data CT+, the other set of encoded data CT− is obtained. The other set of encoded data CT− may be 1111100000.

In embodiments of the present disclosure, when the positive and negative pins of the transmitting end and the receiving end are correspondingly connected, the specified set of encoded data sent by the transmitting end may also be referred to as a positive code. Correspondingly, when the positive and negative pins of the transmitting end and the receiving end are reversely connected, the other set of encoded data sent by the transmitting end may be referred to as a negative code.

In addition, In embodiments of the present disclosure, the encoding rule and decoding rule agreed in advance between the transmitting end and the receiving end may also be set on the premise that the positive and negative pins of the transmitting end and the receiving end are reversely connected. Correspondingly, in the above steps 201 and 202, after the transmitting end encodes the clock training data based on the agreed encoding rule, the other set of encoded data may be obtained. The other set of encoded data may then be encoded to obtain the specified set of encoded data.

Step 203: detecting whether the positive and negative pins of the transmitting end and the receiving end are correspondingly connected.

When the positive and negative pins of the transmitting end and the receiving end are correspondingly connected, step 204 is performed. When the positive and negative pins of the transmitting end and the receiving end are reversely connected, step 205 is performed.

As an optional implementation, a developer may manually check whether the positive and negative pins of the transmitting end and the receiving end are correspondingly connected. When the developer determines that the positive and negative pins of these two are correspondingly connected, the transmitting end may receive a first configuration instruction input by the developer, and thereby determine the positive and negative pins of the transmitting end and the receiving end are correspondingly connected. The transmitting end may perform step 204 based on the first configuration instruction. When the developer determines that the positive and negative pins of these two are reversely connected, the transmitting end may receive a second configuration instruction input by the developer, and thereby determine the positive and negative pins of the transmitting end and the receiving end are reversely connected. The transmitting end may perform step 205 based on the second configuration instruction.

As another optional implementation, the transmitting end may also automatically detect whether the positive and negative pins thereof are correspondingly connected to the positive and negative pins of the receiving end, and may perform step 204 or step 205 based on the detection result. For example, the transmitting end may first send the specified set of encoded data to the receiving end, and when a state fed back by the receiving end is a loss-of-lock state, the transmitting end may determine that the positive and negative pins of these two are reversely connected; when the state fed back by the receiving end is a locked state, the transmitting end may determine that the positive and negative pins of these two are correspondingly connected.

Step 204: when the positive and negative pins of the transmitting end and the receiving end are correspondingly connected, sending a specified set of encoded data in the two sets of encoded data to the receiving end. After that, step 206 is performed.

When the positive and negative pins of the transmitting and the receiving end are correspondingly connected, the transmitting end may send the specified set of encoded data to the receiving end. After receiving the encoded data, the receiving end may directly decode the encoded data based on the decoding rule corresponding to the agreed encoding rule to obtain the clock training data, and then perform clock training according to the clock training data.

Exemplarily, as shown in FIG. 5, it is assumed that the positive and negative pins of the timing controller 01 and the source driving chip 02 are correspondingly connected, that is, the positive pins DPs of these two are correspondingly connected and the negative pins DNs of these two are correspondingly connected. Thus, the timing controller 01 may send the specified set of encoded data CT+ to the source driving chip 02. Moreover, in order to ensure accurate alignment of clocks of these two, referring to FIG. 5, the timing controller 01 may continuously transmit the specified set of encoded data CT+ to the source driving chip 02 several times.

Step 205: when the positive and negative pins of the transmitting end and the receiving end are reversely connected, sending the other set of encoded data in the two sets of encoded data to the receiving end. After that, step 206 is performed.

When the positive and negative pins of the transmitting end and the receiving end are reversely connected, the transmitting end may send the other set of encoded data in the two sets of encoded data than the specified set of encoded data to the receiving end. Since the other set of encoded data is complementary to the specified set of encoded data, when the positive and negative pins of the transmitting end and the receiving end are reversely connected, the encoded data actually received by the receiving end is the same as the specified set of encoded data, so the receiving end may still perform correct decoding to obtain the clock training data and then perform clock training.

Exemplarily, as shown in FIG. 5, if the positive and negative pins of the timing controller 01 and the source driving chip 02 are reversely connected, that is, the negative pin DN of the timing controller 01 is connected to the positive pin of the source driving chip 02 and the positive pin DP of the timing controller 01 is connected to the negative pin of the source driving chip 02, the timing controller 01 may send the other set of encoded data CT− to the source driving chip 02.

Step 206: encoding deviation correction data and then sending the encoded deviation correction data to the receiving end.

In embodiments of the present disclosure, after clock training is implemented between the transmitting end and the receiving end, in order to further ensure bit alignment between the transmitting end and the receiving end, the transmitting end may also encode the deviation correction data (also referred to as LSP data) and then send the encoded deviation correction data to the receiving end. The receiving end may perform bit alignment according to the deviation correction data to ensure accuracy in decoding the subsequently received display data and instruction data. The encoded deviation correction data may also be 10-bit data, and the 10-bit data is binary data. Exemplarily, the encoded deviation correction data may be 1011000100.

In addition, in order to ensure accurate bit alignment between the transmitting end and the receiving end, the transmitting end may sequentially send a plurality of encoded deviation correction data to the receiving end. For example, as shown in FIG. 5, the timing controller 01 may sequentially transmit a plurality of encoded deviation correction data such as LSP1+, LSP2−, and LSP3+ to the source driving chip.

Further, when the deviation correction data is encoded, the value of the first bit (also referred to as the first digit) of each encoded deviation correction data and that of the last bit (also called the last digit) of its adjacent previous data may also be made different, that is, there is a jump edge between every two adjacent encoded data. Accordingly, not only DC balance is achieved when there is data transmission between the transmitting end and the receiving end, but also the receiving end may clearly distinguish every two adjacent encoded data to achieve accurate decoding.

It should be noted that, in embodiments of the present disclosure, bits of encoded data are arranged in order from low to high. For example, the encoded data 0000011111 is arranged from right to left, that is, its first bit is 1 and the last bit is 0.

It should also be noted that, in order to ensure that the receiving end correctly distinguishes different types of data, the transmitting end may also send termination instruction data K2 for indicating termination of transmission to the receiving end after sending the encoded clock training data. Similarly, the transmitting end may encode the termination instruction data K2 and then send the encoded termination instruction data K2, and the transmitting end may encode the termination instruction data K2 based on a set of encoded data sent to the receiving end to ensure the first bit of the encoded termination instruction data K2 is different from the last bit of its adjacent previous data (i.e., the last bit of the set of encoded data sent to the receiving end).

Exemplarily, as shown in FIG. 5, it is assumed that the positive and negative pins of the timing controller 01 and the source driving chip 02 are correspondingly connected, and a set of encoded data sent by the transmitting end to the receiving end is the specified set of encoded data CT+. Thus, the encoded data that the transmitting end obtains by encoding the termination instruction data K2 based on the encoded data CT+ may be a negative code K2−, and the value of the first bit of the negative code K2− is different from that of the last bit of the encoded data CT+. If the positive and negative pins of the timing controller 01 and the source driving chip 02 are reversely connected, and the set of encoded data sent by the transmitting end to the receiving end is the other set of encoded data CT−, the encoded data that the transmitting end obtains by encoding the termination instruction data K2 based on the encoded data CT− may be a positive code K2+, and the value of the first bit of the positive code K2+ is different from that of the last bit of the other set of encoded data CT−. Moreover, the negative code K2− is complementary to the positive code K2+.

Further, the transmitting end may encode the first deviation correction data according to the encoded termination instruction data, so that the value of the first bit of the encoded first deviation correction data is different from that of the last bit of its adjacent previous data (i.e., the last bit of the encoded termination instruction data).

Exemplarily, as shown in FIG. 5, if the positive and negative pins of the timing controller 01 and the source driving chip 02 are correspondingly connected, and the encoded termination instruction data is K2−, the encoded data that the transmitting end obtains by encoding the first deviation correction data LSP1 based on the negative code K2− may be a positive code LSP1+. Referring to FIG. 6, the positive code LSP1+ may be 1011000100. If the positive and negative pins of the timing controller 01 and the source driving chip 02 are reversely connected, and the encoded termination instruction data is the positive code K2+, the encoded data that the transmitting end obtains by encoding the first deviation correction data LSP1 based on the positive code K2+ may be a negative code LSP1−. Referring to FIG. 6, the negative code LSP1− may be 0100111011. As can be seen from FIG. 6, the positive code LSP1+ is complementary to the negative code LSP1−.

Thereafter, the transmitting end may sequentially encode a plurality of subsequent deviation correction data based on the encoded first deviation correction data, so that the value of the first bit of each encoded deviation correction data is different from that of the last bit of its adjacent previous data, whereby alternate output of positive and negative codes may be achieved.

Exemplarily, as shown in FIG. 5, if the positive and negative pins of the timing controller 01 and the source driving chip 02 are correspondingly connected, and the encoded first deviation correction data is a positive code LSP1+, then the encoded data that the transmitting end obtains by encoding a plurality of subsequent deviation correction data may be LSP2−, LSP3+, and LSP4−, and the like. If the positive and negative pins of the timing controller 01 and the source driving chip 02 are reversely connected, and the encoded first deviation correction data is a negative code LSP1−, the encoded data that the transmitting end obtains by encoding the plurality of subsequent deviation correction data may be LSP2+, LSP3−, and LSP4+, and the like.

Step 207: encoding the instruction data and then sending the encoded instruction data to the receiving end.

After the clock training and the bit alignment are implemented through the above steps 204 to 206 between the transmitting end and the receiving end, the transmitting end may send encoded display data to the receiving end. In order to ensure that the receiving end accurately distinguishes the display data, the transmitting end may send corresponding encoded instruction data respectively before and after sending the encoded display data. Optionally, the encoded instruction data may also be 10-bit binary data.

As shown in FIG. 7, the transmitting end may encode start instruction data K1 for indicating the start of data transmission and send the encoded start instruction data K1 to the receiving end before sending the display data. Moreover, the value of the first bit of the encoded start instruction data K1 may be different from that of the last bit of its adjacent previous data (i.e., the last bit of the encoded last deviation correction data).

Exemplarily, in conjunction with FIG. 5 and FIG. 7, if the positive and negative pins of the timing controller 01 and the source driving chip are correspondingly connected, and the encoded last deviation correction data sent by the transmitting end to the receiving end is the negative code LSP4−, then the encoded data that the transmitting end obtains by encoding the start instruction data K1 may be a positive code K 1+. Referring to FIG. 8, the positive code K 1+ may be 0111111010. If the positive and negative pins of the timing controller 01 and the source driving chip 02 are reversely connected, and the encoded last deviation correction data sent by the transmitting end to the receiving end is the positive code LSP4+, the encoded data that the transmitting end obtains by encoding the start instruction data K1 may be a negative code K1−. Referring to FIG. 8, the negative code K1− may be 1000000101. The negative code K1− is complementary to the positive code K1+.

Step 208: encoding the display data and then sending the encoded display data to the receiving end.

Further, the transmitting end may encode the display data according to a preset encoding rule and then sending the encoded display data to the receiving end. The encoded display data may be 10-bit binary data. In an embodiment of the present disclosure, the display data may comprise at least one byte to be encoded. The transmitting end may encode each byte to be encoded into 10-bit data and then sequentially send the encoded byte to the receiving end. Referring to FIG. 7, it can be seen that the transmitting end may sequentially send a plurality of 10-bit data corresponding to the display data to the receiving end, wherein the value of the first bit of each 10-bit data may be different from that of the last bit of its adjacent previous data.

Exemplarily, as shown in FIG. 7, if the positive and negative pins of the timing controller 01 and the source driving chip 02 are correspondingly connected, and the encoded start instruction data sent by the transmitting end is the positive code K1+, the encoded data that the transmitting end obtains by encoding the first to-be-encoded byte D0 of the display data based on the positive code K1+ may be a negative code D0−. Referring to FIG. 9, the negative code D0− may be 1110011101. If the positive and negative pins of the timing controller 01 and the source driving chip 02 are reversely connected, and the encoded start instruction data sent by the transmitting end is a negative code K1−, then the encoded data that the transmitting end obtains by encoding the first to-be-encoded byte D0 of the display data based on the negative code K1− may be a positive code D0+. Referring to FIG. 9, the positive code D0+ may be 0001100010. As can be seen from FIG. 9, the positive code D0+ is complementary to the negative code D0−.

Afterwards, the transmitting end may sequentially encode a plurality of subsequent bytes that are to be encoded based on the encoded first to-be-encoded byte, so that the value of the first bit of each encoded to-be-encoded byte is different from that of the last bit of its adjacent previous data, thereby enabling alternate output of positive and negative codes.

Exemplarily, if the positive and negative pins of the timing controller 01 and the source driving chip 02 are correspondingly connected, and the encoded first to-be-encoded byte is a negative code D0−, then, as shown in FIG. 7, the encoded data that the transmitting end obtains by encoding a plurality of subsequent to-be-encoded bytes may be D1+, D2−, D3+, and the like. If the positive and negative pins of the timing controller 01 and the source driving chip 02 are reversely connected, and the encoded first to-be-encoded byte is a positive code D0+, then, as shown in FIG. 7, the encoded data that the transmitting end obtains by encoding a plurality of subsequent to-be-encoded bytes may be D1−, D2+, D3−, and the like.

Optionally, In embodiments of the present disclosure, each to-be-encoded byte of the display data may be encoded using a 8 b/10 b data transmission approach (that is, encoding 8-bit data into 10-bit data). Referring to FIG. 10, the above step 208 may comprise:

Step 2081: encoding each to-be-encoded byte of the display data into 9-bit data.

In an embodiment of the present disclosure, the display data may comprise at least one to-be-encoded byte, and each to-be-encoded byte is 8-bit data. The transmitting end may encode the 8-bit data corresponding to each to-be-encoded byte into 9-bit data as follows:

enc[0]=d[3];
enc[1]=(~d[2]& d[1]) (d[2]& d[1] &~d[3]) (~d[2]&~d[0]);
enc[2]=(d[2]&~d[1]) (d[2]& d[1] &~d[3]) (~d[2]&d[0]);
enc[3]=d[5];

enc[4]=d[6];

enc[5]=(~d[2]&~d[1] &~d[4]) (d[2]&~d[0]) (d[1]&~d[0]);

enc[6]=(~d[2]&~d[1] &~d[4]) (d[2]&d[0]) (d[1]& d[0]);

enc[7]=d[4];

enc[8]=d[7];

where enc[i] is the i+1$^{th}$ bit in the 9-bit data, 8≥i≥0, and i is an integer; d[j] is the j+1$^{th}$ bit in the 8-bit data, 7≤j≤0, and j is an integer; ~ means performing a negation operation, & means performing an AND operation, and means performing an OR operation. The negation operation means that the binary bit is negated. For example, 1 is negated to 0, and 0 is negated to 1. The AND operation means performing AND operation on two binary bits, and the rule is that the result is true when both of the bits are 1, otherwise the result is false, wherein true corresponds to 1, false corresponds to 0, then 1 & 1=1, 1 & 0=0, 0 & 1=0, 0&0=0. The OR operation means performing OR operation on two binary bits, and the rule is that the result is true as long as one of them is 1, wherein true corresponds to 1, false corresponds to 0, then 1|1=1, 1|0=1, 0|1=1, 0|0=0.

Figure 11A:
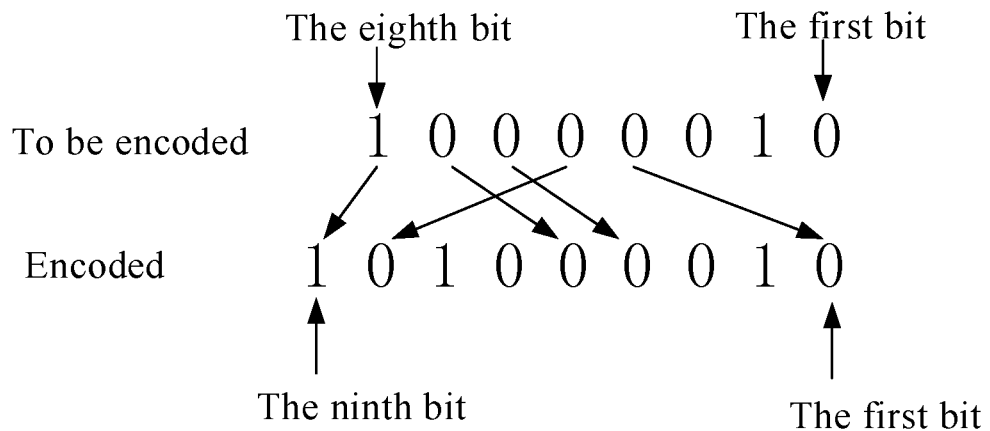
FIG. 11A is a schematic diagram illustrating an encoding manner of 8 b/9 b according to an embodiment of the present disclosure.

Exemplarily, as shown in FIG. 11A, it is assumed that the 8-bit data to be encoded is: 10000010, and the first bit to the eighth bit (also referred to as the eighth digit) are sequentially 0, 1, 0, 0, 0, 0, 0, 1, then 9-bit data 101000010 may be obtained by encoding based on the above encoding approach, wherein, in the 9-bit data:

The first bit enc[0]=d[3]=0;

The second bit enc[1]=(~d[2]& d[1])|(d[2]& d[1] &~d[3])|(~d[2]&~d[0])=(~0&1)|(0& 1&~0)|(~0&~0)=(1& 1)|(0& 1&1)|(1&1)=1|0|1=1;

The third bit enc[2]=(d[2]&~d[1])|(d[2]& d[1] &~d[3])|(~d[2]&d[0])=(0&~1)|(0& 1&~0)|(~0&0)=(0& 0)|(0& 1&1)|(1 &0)=0|0|0=0;

The fourth bit enc[3]=d[5]=0;

The fifth bit enc[4]=d[6]=0;

The sixth bit enc[5]=(~d[2]&~d[1] &~d[4])|(d[2]&~d[0])|(d[1]&~d [0])=(~0&~1 &~0)|(0&~0)|(1&~0)=(1& 0&1)|(0& 1)|(1& 1)=0|0|1=1;

The seventh bit enc[6]=(~d[2]&~d[1] &~d[4])|(d[2]&d[0])|(d[1]& d[0])=(~0&~1 &~0)|(0&0)|(1& 0)=(1& 0& 1)|(0&0)|(1& 0)=0|0|0=0;

The eighth bit enc[7]=d[4]=0;

The ninth bit enc[8]=d[7]=1.

The above encoding approach may ensure that at least one of any consecutive 5 bits of the 9-bit data is different from the other bits, that is, there are no consecutive five 0 or consecutive five 1 in the 9-bit data.

Step 2082: detecting a first bit of the 9-bit data and a last bit of its previous data that is adjacent to the first bit.

Since the data sent by the transmitting end is encoded in order, there is at least one encoded byte or one encoded instruction data preceding the to-be-encoded byte. For example, there may exist one byte that has been 8 b/10 b encoded before the to-be-encoded byte, and one byte that has been 8 b/10 b encoded is actually 10-bit data converted from the original 8-bit data. Therefore, one encoded byte corresponds to 10-bit data. For the 9-bit data to be encoded, the first bit of the 9-bit data and the last bit of its previous data (i.e., the last bit of the previous 10-bit data) that is adjacent to the first bit may be detected to compare whether the two bits are the same for the purpose of addition of the tenth bit. The tenth bit is indicative of whether the 9-bit data has undergone a negation operation. If the two bits are the same, step 2083 may be performed; and if the two bits are different, step 2084 may be performed.

Step 2083: when the value of the first bit is the same as that of the last bit and after the 9-bit data is negated, a tenth bit for indicating that the 9-bit data has undergone the negation operation is appended to the 9-bit data, thereby obtaining 10-bit data.

In embodiments of the present disclosure, the tenth bit is indicative of whether the 9-bit data has undergone a negation operation, thereby ensuring that the receiving end can effectively decode the received data.

Exemplarily, supposing that the tenth bit being 1 indicates that the 9-bit data has undergone the negation operation, and the tenth bit being 0 indicates that the 9-bit data has not undergone the negation operation. Thus, when both the first bit of the 9-bit data and the last bit of its adjacent previous data are 0, or both the first bit of the 9-bit data and the last bit of its adjacent previous data are 1, a tenth bit for indicating that the 9-bit data has undergone the negation operation, that is, a tenth bit of value 1, is appended to the 9-bit data after the 9-bit data is negated, thereby obtaining 10-bit data.

Figure 11B:
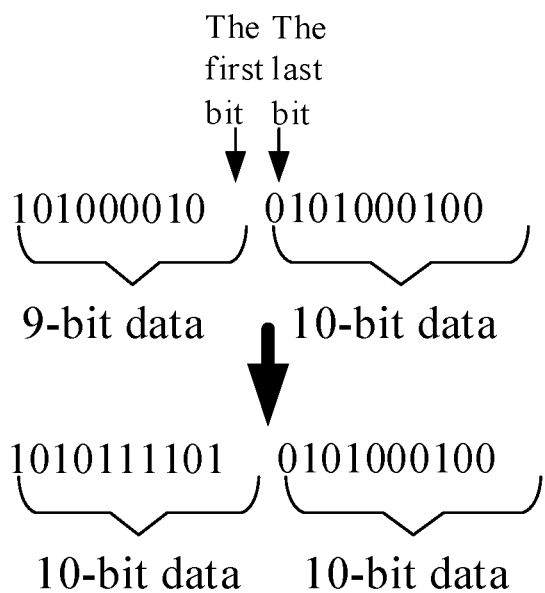
FIG. 11B is a schematic diagram illustrating an encoding manner of 9 b/10 b according to an embodiment of the present disclosure.

Exemplarily, as shown in FIG. 11B, it is assumed that the 9-bit data to be encoded is 101000010, and the 10-bit data that precedes and is adjacent to the 9-bit data is 0101000100. Because the first bit of the 9-bit data is 0, and the last bit of the previous 10-bit data is 0 (that is, the bit preceding the first bit is 0), the two bits are the same. In this case, the 9-bit data may be negated to obtain 010111101, and then a tenth bit of value 1 may be appended. As a result, the 10-bit data finally obtained is 1010111101.

Step 2084: when the value of the first bit is different from that of the last bit, a tenth bit indicating that the 9-bit data has not undergone the negation operation is appended to the 9-bit data to obtain 10-bit data.

Exemplarily, supposing that the tenth bit being 1 indicates that the 9-bit data has undergone the negation operation, and the tenth bit being 0 indicates that the 9-bit data has not undergone the negation operation. When one of the first bit of the 9-bit data and the last bit of the previous data is 0 and the other is 1, a tenth bit indicating that the 9-bit data has not undergone the negation operation, that is, a tenth bit of value 0, may be appended to the 9-bit data, thereby obtaining 10-bit data.

Figure 11C:
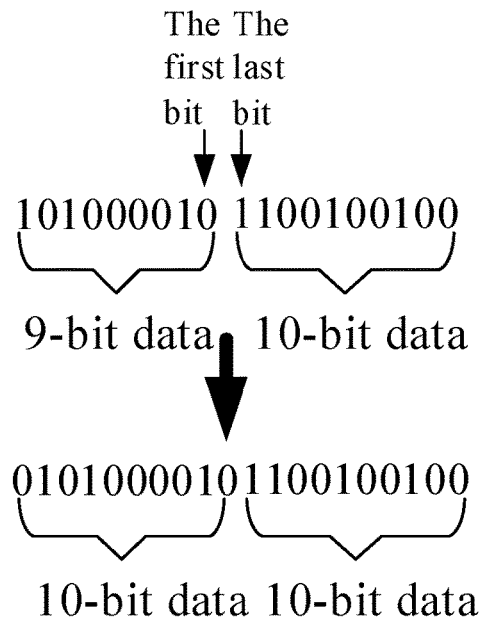
FIG. 11C is a schematic diagram illustrating another encoding manner of 9 b/10 b according to an embodiment of the present disclosure.

Exemplarily, as shown in FIG. 11C, it is assumed that the 9-bit data to be encoded is 101000010, and the 10-bit data that immediately precedes the 9-bit data is 1100100100. Because the first bit of the 9-bit data is 0, and the last bit of its previous 10-bit data is 1 (that is, the bit preceding the first bit is 1), the two bits are different. In this case, a tenth bit of value 0 may be appended to the 9-bit data. As a result, the 10-bit data finally obtained is 0101000010.

With the above steps 2083 and 2084, it may be ensured that there is a jumping edge between every two adjacent encoded bytes (that is, every two adjacent 10-bit data), which facilitates the receiving end to clearly distinguish every two adjacent encoded bytes to achieve accurate decoding of the display data.

Step 2085: sending the obtained 10-bit data to the receiving end.

Finally, the transmitting end may send the encoded 10-bit data to the receiving end through a differential signal line, and the receiving end may decode the 10-bit data based on the corresponding decoding rule, thereby recovering the display data.

As can be seen in conjunction with FIG. 5 and FIG. 7, for two connection manners applied to positive and negative pins of the transmitting end and the receiving end (i.e., the positive and negative pins are correspondingly connected and the positive and negative pins are reversely connected), the transmitting end may encode each type of data to be transmitted to obtain two kinds of encoded data for that type, and each kind of encoded data corresponds to a respective connection manner. The two kinds of encoded data are complementary, and each kind of encoded data is different from any other encoded data sent by the transmitting end, that is, each kind of encoded data is unique encoded data to ensure that the receiving end is able to correctly decode it.

Figure 12:
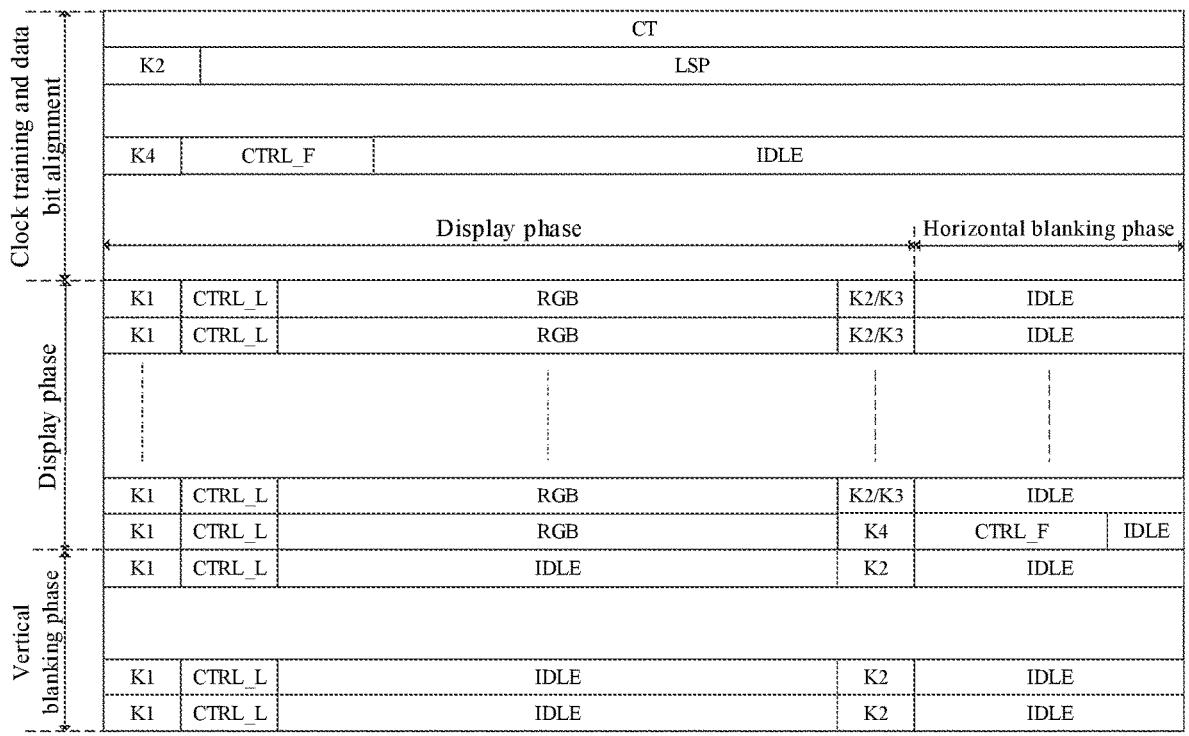
FIG. 12 is a schematic diagram illustrating a still further structure of data sent by a further timing controller to a source driving chip according to an embodiment of the present disclosure.

FIG. 12 is a schematic diagram illustrating a structure of data sent by a timing controller according to an embodiment of the present disclosure. Referring to FIG. 12, after being powered on, a timing controller may sequentially send encoded clock training data CT and encoded deviation correction data to a source driving chip to implement clock training and bit alignment between these two. Further, the timing controller may send to the source driving chip end instruction data K4 for indicating end of transmission of one frame of display data, and frame control register setting data CTRL_F.

Then, a display phase may be entered. In the display phase, the timing controller may sequentially send display data corresponding to each row of pixels, e.g., display data as shown in FIG. 12, such as red, green and blue (RGB) data, to the source driving chip. Before sending the display data corresponding to each row of pixels, the timing controller may first send start instruction data K1 for indicating start of data transmission and Line Control Register setting data CTRL_L. After sending the display data corresponding to each row of pixels, the timing controller may send termination instruction data K2 for indicating termination of the data transmission or send line termination instruction data K3 for indicating transmission termination of display data corresponding to one row of pixels. After transmission of the display data corresponding to the last row of pixels is completed, the timing controller may send end instruction data K4 for indicating the end of data transmission, and frame control register setting data CTRL_F.

Finally, the display device may enter a vertical blanking (VBlank) phase. In the VBlank phase, the timing controller may sequentially send blanking data corresponding to each row of pixels to the source driving chip, and may send start instruction data K1 indicating the start of data transmission and line control register setting data CTRL_L before sending the blanking data corresponding to each row of pixels. After sending the blanking data corresponding to each row of pixels, the timing controller may send termination instruction data K2 for indicating termination of the data transmission. The blanking data may be IDLE data, that is, invalid data. For example, the blanking data may all be 0, or the blanking data may be obtained using the same encoding approach as the display data.

It can also be seen from FIG. 12 that after transmission of display data corresponding to one row of pixels is completed, and before display data corresponding to a next row of pixels starts to be transmitted, there is a horizontal blanking phase. In the horizontal blanking phase, the timing controller may send blanking data to the source driving chip, and the blanking data may be invalid data, for example, the blanking data may all be zero.

It should be noted that, in the above description of FIG. 12, data sent by the timing controller all refers to encoded data. Further, in the data structure shown in FIG. 12, the instruction data K1 to K4 may also be referred to as identification codes.

In addition, it should be noted that, in embodiments of the present disclosure, two sets of clock training data with opposite phases may be reserved in advance inside the source driving chip during the procedure of circuit design. After a set of encoded data corresponding to the clock training data sent by the timing controller is detected upon power on, the received set of encoded data may be separately compared with the two sets of clock training data stored therein, and a set of completely identical clock training data may be selected therefrom for subsequent clock training actions. Therefore, the following problem can be avoided: when only one set of clock training data is stored in the source driving chip, and the set of encoded data sent by the timing controller is inconsistent with the set of clock training data stored in the source drive chip, the source driving chip would not recognize the received set of encoded data as clock training data, and thus would not perform clock training.

In summary, the embodiment of the present disclosure provides a data transmission method, which may generate two sets of encoded data that are complementary to each other when encoding clock training data. When positive and negative pins of the transmitting end and the receiving end are correspondingly connected, the transmitting end may send a specified set of encoded data, and the receiving end may perform normal decoding based on the specified set of encoded data. When the positive and negative pins of the transmitting end and the receiving end are reversely connected, the transmitting end may send the other set of encoded data. Since the other set of encoded data is complementary to the specified set of encoded data, the encoded data actually received by the receiving end is the same as the specified set of encoded data when the positive and negative pins are reversely connected, and thus may be correctly decoded. Therefore, the problem that the receiving end fails to perform correct decoding due to wrong connection between pins of the transmitting end and the receiving end will then be avoided, and the reliability and flexibility of data transmission are effectively improved. When the data transmission method is applied to a display device, since the positive and negative pins of the timing controller and the source driving chip is allowed to be correspondingly connected or reversely connected, the design flexibility of the timing controller, source driving chip, and then PCB can be effectively improved, and increase in manufacturing cost of the display device due to wrong connection of the positive and negative pins of the timing controller and the source driving chip will be avoided.

It should be noted that the sequence of steps of the data transmission method provided by the embodiment of the present disclosure may be appropriately adjusted, and steps may also be correspondingly increased or decreased as appropriate. For example, step 203 may be omitted as the case may be, that is, the transmitting end may directly determine the connection relationship of the positive and negative pins of the transmitting end and the receiving end based on a received configuration instruction. Alternatively, step 207 may also be performed before step 206 or after step 208. Any method that would be easily conceived by those skilled in the art and within the technical scope of the present disclosure is intended to be included within the scope of the present disclosure.

Figure 13:
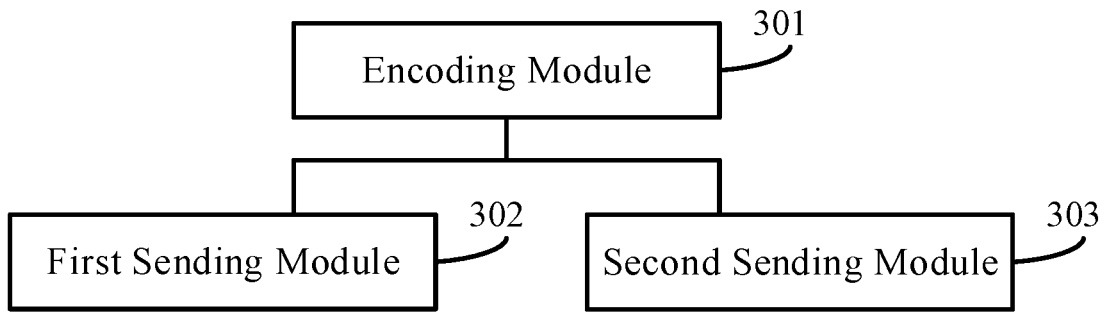
FIG. 13 is a schematic structural diagram of a data transmission device according to an embodiment of the present disclosure.

The embodiment of the present disclosure further provides a data transmission device, which may be applied to a transmitting end. Referring to FIG. 13, the device may comprise:

an encoding module 301 for encoding the clock training data to obtain two sets of encoded data corresponding to the clock training data and complementary to each other;

a first sending module 302 for sending a specified set of encoded data in two sets of encoded data to the receiving end when positive and negative pins of a transmitting end and a receiving end are correspondingly connected;

a second sending module 303 for sending the other set of encoded data in the two sets of encoded data than the specified set of encoded data to the receiving end when the positive and negative pins of the transmitting end and the receiving end are reversely connected, the receiving end being configured to perform clock training based on the received encoded data.

Optionally, the encoding module 301 is configured to encode the clock training data according to an encoding rule agreed with the receiving end, to obtain the specified set of encoded data; and negate the specified set of encoded data to obtain the other set of encoded data.

Figure 14:
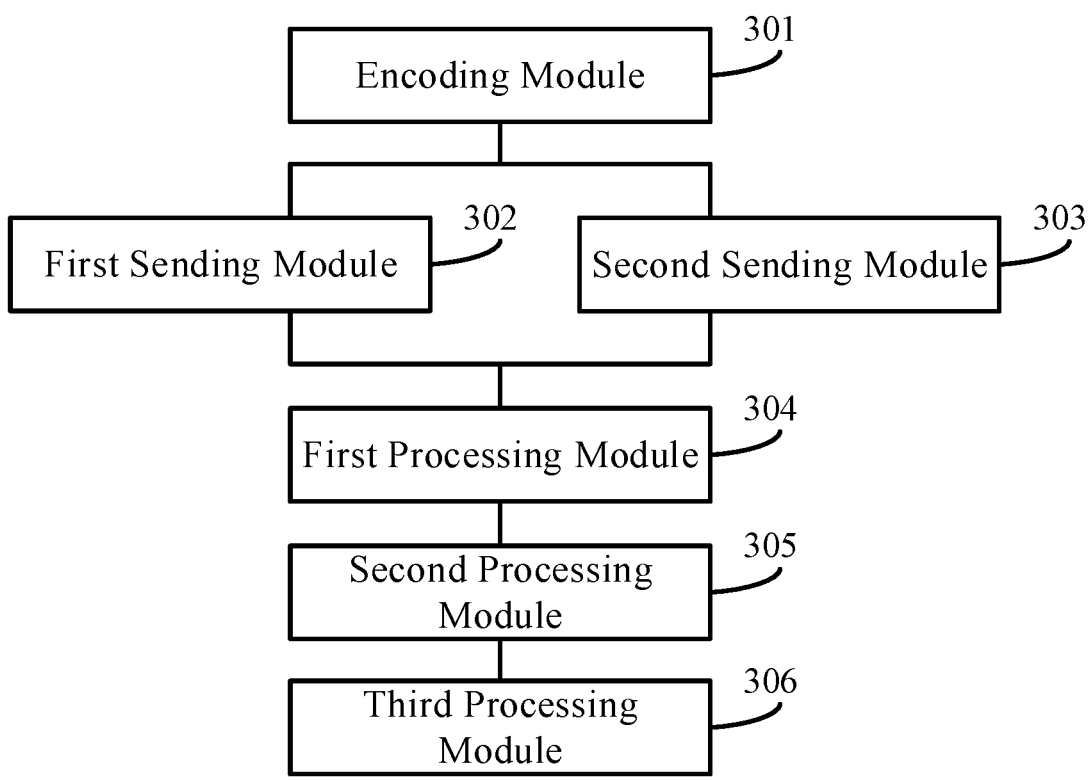
FIG. 14 is a schematic structural diagram of a further data transmission device according to an embodiment of the present disclosure.

FIG. 14 is a schematic structural diagram of another data transmission device according to an embodiment of the present disclosure. As shown in FIG. 14, the device may further comprise:

a first processing module 304 for encoding deviation correction data and sending encoded deviation correction data to the receiving end after a set of encoded data corresponding to the clock training data is sent to the receiving end. The receiving end is configured to perform bit alignment according to the deviation correction data.

Optionally, either set of encoded data and the encoded deviation correction data are all 10-bit data, and the 10-bit data is binary data.

Optionally, the value of the first bit of the encoded deviation correction data is different from that of the last bit of its adjacent previous data.

Optionally, as shown in FIG. 14, the device may further comprise: a second processing module 305 and a third processing module 306. The second processing module 305 is configured to encode instruction data and send the encoded instruction data to the receiving end after the encoded deviation correction data is sent to the receiving end. The third processing module 306 is configured to encode display data and send the encoded display data to the receiving end.

Optionally, the encoded instruction data and the encoded display data are all 10-bit data, and the 10-bit data is binary data.

In the encoded instruction data and the encoded display data, the value of the first bit of each 10-bit data is different from that of the last bit of its previous 10-bit data.

Optionally, the display data comprises at least one byte to be encoded. Each of the bytes to be encoded is 8-bit data, and the third processing module 306 may be configured to: encode 8-bit data corresponding to each byte to be encoded into 9-bit data; and detect the first bit of the 9-bit data and the last bit of its previous data that is adjacent to the first bit of the 9-bit data. When the value of the first bit is the same as that of the last bit, the 9-bit data is negated, and then a tenth bit for indicating that the 9-bit data has undergone the negation operation is appended to the 9-bit data to obtain 10-bit data. When the value of the first bit is different from that of the last bit, a tenth bit indicating that the 9-bit data has not undergone the negation operation is appended to the 9-bit data to obtain 10-bit data. The obtained 10-bit data is sent to the receiving end.

In summary, an embodiment of the present disclosure provides a data transmission device that may generate two sets of encoded data that are complementary to each other when encoding clock training data. When positive and negative pins of the transmitting end and the receiving end are correspondingly connected, a specified set of encoded data may be sent. The receiving end may decode normally based on the specified set of encoded data. When the positive and negative pins of the transmitting end and the receiving end are reversely connected, the other set of encoded data may be sent. Since the other set of encoded data is complementary to the specified set of encoded data, when the positive and negative pins are reversely connected, the encoded data actually received by the receiving end is the same as the specified set of encoded data, and thus may be correctly decoded. Therefore, the problem that the receiving end fails to perform correct decoding due to wrong connection between pins of the transmitting end and the receiving end will be avoided, and the reliability and flexibility of data transmission are effectively improved.

An embodiment of the present disclosure also provides a data transmission device, which may comprise a memory, a processor, and a computer program stored in the memory and executable in the processor. When the processor executes the computer program, the data transmission method provided by the above method embodiment may be implemented.

An embodiment of the present disclosure further provides a data transmission system, which may comprise a transmitting end and a receiving end, and the transmitting end may comprise a data transmission device according to an embodiment of the present disclosure, for example, a data transmission device illustrated in FIG. 13 or FIG. 14.

An embodiment of the present disclosure also provides a display device. The display device may comprise a timing controller 01 and a source driving chip 02 connected to the timing controller. The timing controller may serve as a transmitting end, and the source driving chip may serve as a receiving end. The timing controller may comprise a data transmission device according to an embodiment of the present disclosure, such as a data transmission device illustrated in FIG. 13 or FIG. 14.

An embodiment of the present disclosure also provides a computer readable storage medium. The computer readable storage medium stores instructions for causing a computer to execute a data transmission method according to an embodiment of the present disclosure, such as a data transmission method as shown in FIG. 2 or FIG. 3, when the computer readable storage medium is executed on the computer. The computer readable storage medium may be a non-transitory computer readable storage medium.

An embodiment of the present disclosure provides a chip. The chip may comprise a programmable logic circuitry and/or program instruction that may be used to implement a data transmission method as provided by the above method embodiments when the chip operates.

With regard to the device, chip and system in the above embodiments, the specific way in which the respective modules perform the operations has been described in detail in the embodiments relating to the method, and will not be explained in detail herein. Also, in embodiments of the present disclosure, "/" may represent conversion, for example, 8 b/9 b represents conversion of 8-bit data into 9-bit data, and 9 b/10 b represents conversion of 9-bit data into 10-bit data.

The technical solutions provided by the embodiments of the present disclosure may comprise the following beneficial effects:

In the data transmission method, device, system and display device provided by the embodiments of the present disclosure, the transmitting end may generate two sets of encoded data that are complementary to each other when encoding clock training data, and when positive and negative pins of the transmitting end and the receiving end are correspondingly connected, the transmitting end may send a specified set of encoded data, and the receiving end may perform normal decoding based on the specified set of encoded data; when the positive and negative pins of the transmitting end and the receiving end are reversely connected, the transmitting end may send the other set of encoded data. Since the other set of encoded data is complementary to the specified set of encoded data, when the positive and negative pins are reversely connected, the encoded data actually received by the receiving end is the same as the specified set of encoded data, and thus may be correctly decoded. Therefore, the problem that the receiving end fails to perform correct decoding due to wrong connection between pins of the transmitting end and the receiving end will be avoided, and the reliability and flexibility of data transmission are effectively improved.

Various embodiments may be implemented using hardware units, software units, or a combination thereof. Examples of hardware units may comprise equipment, components, processors, microprocessors, circuits, circuit elements (e.g., transistors, resistors, capacitors, inductors, etc.), integrated circuits, application specific integrated circuits (ASICs), programmable logic devices (PLDs), digital signal processors (DSPs), field programmable gate arrays (FPGAs), memory cells, logic gates, registers, semiconductor devices, chips, microchips, chipsets, and the like. Examples of software units may comprise software components, programs, applications, computer programs, application programs, system programs, machine programs, operating system software, middleware, firmware, software modules, routines, subroutines, functions, methods, processes, software interface, application programming interface (API), instruction set, calculation code, computer codes, code segments, computer code segments, words, values, symbols, or any combination thereof. Determining whether an embodiment is implemented by using hardware units and/or software units may vary depending on any number of factors desired for a given implementation, such as desired calculation rate, power level, heat resistance, processing cycle budget, input data rate, output data rate, memory resource, data bus speed, and other design or performance constraint, and the like.

Those skilled in the art may easily conceive other embodiments of the present disclosure after considering the specification and practicing the disclosure disclosed herein. The present disclosure is intended to cover any variations, uses, or adaptations of the present disclosure, which are in accordance with the general principles of the present disclosure and comprise common general knowledge or conventional technical means in the art that are not disclosed in the present disclosure. The specification and embodiments are to be regarded as illustrative only. The true scope and spirit of the present disclosure are pointed out by the claims.

It should be understood that the present disclosure is not limited to the precise structures that have been described above and shown in the drawings, and various modifications and changes can be made without departing from the scope thereof. The scope of the disclosure is to be limited only by the appended claims.

The invention claimed is:

1. A data transmission method, being applied to a transmitting end, the method comprising:
   encoding clock training data to obtain two sets of encoded data corresponding to the clock training data, wherein the two sets of encoded data are complementary to each other;
   sending a specified set of encoded data in the two sets of encoded data to a receiving end when positive and negative pins of the transmitting end and the receiving end are correspondingly connected; and
   sending another set of encoded data in the two sets of encoded data, that is different from the specified set of encoded data, to the receiving end when the positive and negative pins of the transmitting end and the receiving end are reversely connected,
   wherein the receiving end is configured to perform clock training according to received encoded data;
   wherein after sending either the specified set of encoded data or the another set of encoded data corresponding to the clock training data to the receiving end, the method further comprises:
   encoding deviation correction data; and sending the deviation correction data that was encoded to the receiving end, wherein the receiving end is configured to perform bit alignment according to the deviation correction data;
   encoding display data and sending the display data that was encoded to the receiving end;
   wherein the display data comprises at least one byte to be encoded, wherein each of the at least one byte to be encoded comprises 8-bit data, and wherein encoding the display data and sending the display data that was encoded to the receiving end comprises:
   encoding 8-bit data corresponding to each byte of the at least one byte to be encoded into 9-bit data;
   detecting a first bit of the 9-bit data and a last bit of previous data adjacent to the 9-bit data;
   obtaining 10-bit data by, when the first bit of the 9-bit data is same as the last bit of the previous data, appending a tenth bit to the 9-bit data for indicating that the 9-bit data has undergone a negation operation after the 9-bit data is negated;
   obtaining 10-bit data by, when the first bit is different from the last bit of the previous data, appending the tenth bit to the 9-bit data for indicating that the 9-bit data has not undergone a negation operation; and
   sending the 10-bit data to the receiving end.

2. The method according to claim 1, wherein the encoding the clock training data to obtain two sets of encoded data corresponding to the clock training data comprises:
   encoding the clock training data according to an encoding rule agreed with the receiving end to obtain the specified set of encoded data; and
   negating the specified set of encoded data to obtain the another set of encoded data.

3. The method according to claim 1,
   wherein the specified set of encoded data or the deviation correction data that was encoded comprise 10-bit data, and
   wherein the 10-bit data comprises binary data.

4. The method according to claim 3,
   wherein a first bit of the deviation correction data that was encoded is different from a last bit of adjacent previous deviation correction data that was encoded.

5. The method according to claim 1, wherein the method further comprises:

encoding instruction data and sending the instruction data that was encoded to the receiving end.

6. The method according to claim 5,
wherein the instruction data that was encoded and the display data that was encoded each comprise 10-bit data,
wherein the 10-bit data comprises binary data,
wherein a first bit of the 10-bit data in the instruction data that was encoded is different from a last bit of adjacent previous instruction data that was encoded, and
wherein a first bit of the 10-bit data in the display data that was encoded is different from a last bit of adjacent previous display data that was encoded.

7. A data transmission device, comprising:
a memory,
a processor, and
a computer program stored in the memory and executable in the processor, wherein the processor, upon executing the computer program, is configured to perform a data transmission method according to claim 1.

8. A non-transitory computer readable storage medium having stored instructions thereon that, when executed on a computer, cause the computer to perform a data transmission method according to claim 1.

9. A data transmission device, being applied to a transmitting end, the device comprising:
an encoder configured to encode clock training data to obtain two sets of encoded data corresponding to the clock training data, wherein the two sets of encoded data are complementary to each other;
a first sender configured to send a specified set of encoded data in the two sets of encoded data to a receiving end when positive and negative pins of the transmitting end and the receiving end are correspondingly connected; and
a second sender configured to send another set of encoded data in the two sets of encoded data, that is different from the specified set of encoded data, to the receiving end when the positive and negative pins of the transmitting end and the receiving end are reversely connected,
wherein the receiving end is configured to perform clock training according to received encoded data;
wherein the device further comprises:
a first processor configured to encode deviation correction data and send the deviation correction data that was encoded to the receiving end after a set of encoded data corresponding to the clock training data is sent to the receiving end, wherein the receiving end is configured to perform bit alignment according to the deviation correction data; and
a second processor configured to encode display data and then send the display data that was encoded to the receiving end;
wherein the display data comprises at least one byte to be encoded, wherein each of the at least one byte to be encoded comprises 8-bit data, and the second processor is configured to perform operations comprising:
encoding 8-bit data corresponding to each byte of the at least one byte to be encoded into 9-bit data;
detecting a first bit of the 9-bit data and a last bit of previous data adjacent to the 9-bit data;
obtaining 10-bit data by, when the first bit of the 9-bit data is same as the last bit of the previous data, appending a tenth bit to the 9-bit data for indicating that the 9-bit data has undergone a negation operation after the 9-bit data is negated; and
obtaining 10-bit data by, when the first bit is different from the last bit of the previous data, appending the tenth bit to the 9-bit data for indicating that the 9-bit data has not undergone a negation operation; and
sending the obtained 10-bit data to the receiving end.

10. The device according to claim 9, wherein the encoder is configured to perform operations comprising:
encoding the clock training data according to an encoding rule agreed with the receiving end to obtain the specified set of encoded data; and
negating the specified set of encoded data to obtain the another set of encoded data.

11. The device according to claim 9,
wherein the specified set of encoded data or the deviation correction data that was encoded comprise 10-bit data, and
wherein the 10-bit data comprises binary data.

12. The device according to claim 11,
wherein a first bit of the deviation correction data that was encoded is different from a last bit of adjacent previous deviation correction data that was encoded.

13. The device according to claim 9, further comprising:
a third processor configured to encode instruction data and send the instruction data that was encoded to the receiving end after the deviation correction data that was encoded is sent to the receiving end.

14. The device according to claim 13,
wherein the instruction data that was encoded and the display data that was encoded each comprise 10-bit data,
wherein the 10-bit data comprises binary data, and
wherein a first bit of the 10-bit data in the instruction data that was encoded is different from a last bit of adjacent previous instruction data that was encoded, and
wherein a first bit of the 10-bit data in the display data that was encoded is different from a last bit of adjacent previous display data that was encoded.

15. A data transmission system, comprising:
a transmitting end; and
a receiving end,
wherein the transmitting end comprises a data transmission device according to claim 9.

16. A display device, comprising:
a timing controller; and
a source driving chip connected to the timing controller,
wherein the timing controller is a transmitting end and the source driving chip is a receiving end, and
wherein the timing controller comprises the data transmission device according to claim 9.

* * * * *